April 14, 1953  J. L. DUKE  2,634,740
ADJUSTABLE AWNING

Filed Oct. 26, 1949  2 SHEETS—SHEET 1

INVENTOR.
James L. Duke

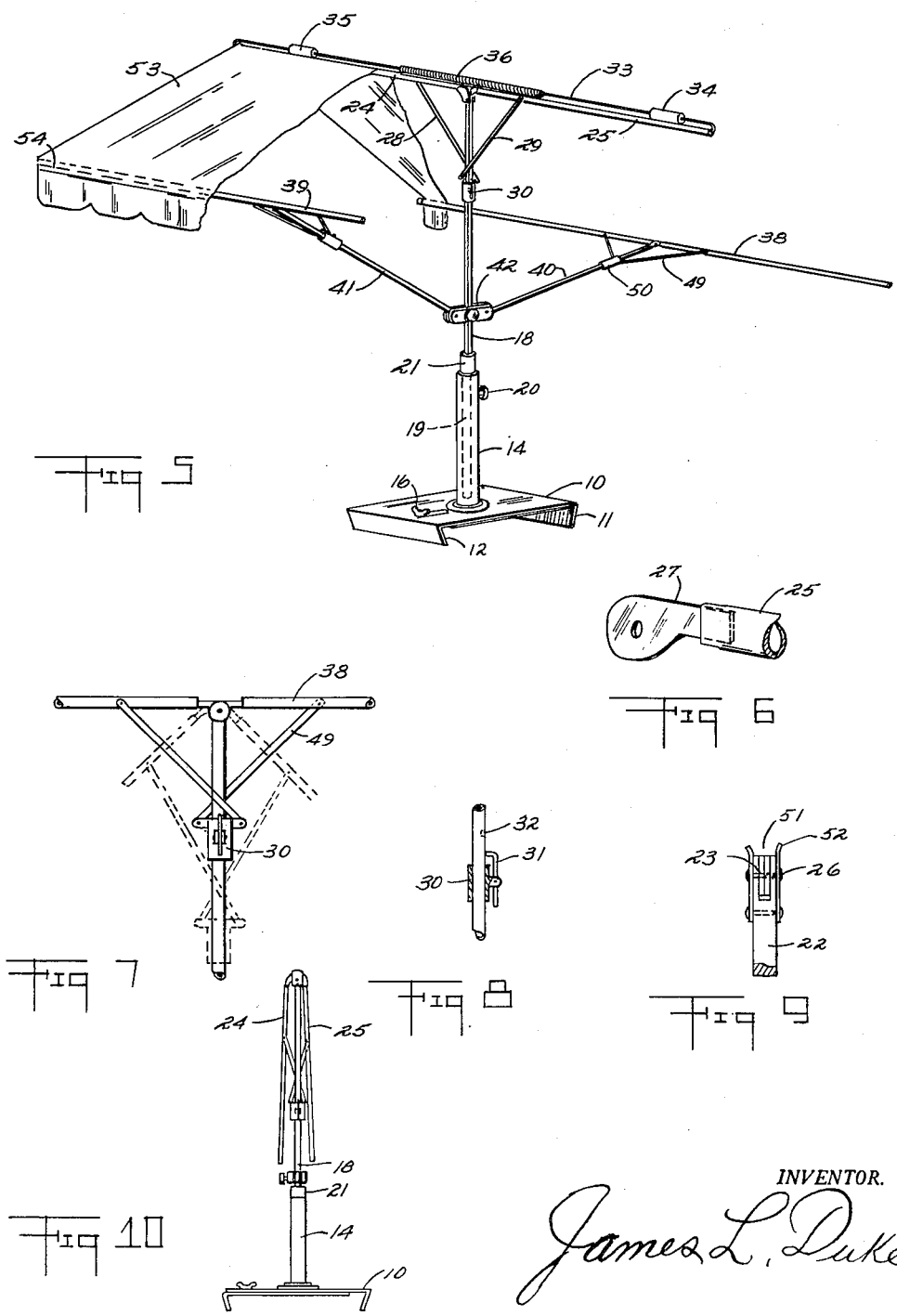

Patented Apr. 14, 1953

2,634,740

UNITED STATES PATENT OFFICE 2,634,740

ADJUSTABLE AWNING

James L. Duke, Shreveport, La.

Application October 26, 1949, Serial No. 123,684

6 Claims. (Cl. 135—6)

My invention relates to an adjustable awning adapted for mounting on a fishing boat, tractor or other vehicle, or to any stationary piece of furniture or the like for the dual purpose of protection against sun and rain and to create a novel means of advertising.

The principal object of the invention is to provide a light, attractive awning which may be mounted to a seat of an ordinary fishing boat but which may also be adapted for any other vehicle or used as lawn furniture; and which may be readily adjusted to any radial position in a horizontal plane according to the position of the sun and also which may be adjusted vertically along a center standard in order that the awning proper may be set to any desired height by the user.

A further object of the invention is to provide such an awning having a framework which may be folded into a tight, compact bundle when not in use to facilitate shipping and whereby the same may require a minimum of space when transported in an automobile or the like.

A further object of the invention is to provide an adjustable awning which combines its utility features with a novel means of advertising by having the awning proper made of colored cloth material carrying advertisements of various concerns or products. Such advertising as painted or printed on the cloth might be carried on the push cart of ice cream vendors to advertise a certain brand of ice cream, or carried by rented fishing boats to solicit trade at certain boat landings. In this manner the device is not only useful but also enhances the sale and use of the various products it is made to advertise.

A further object of the invention is to provide an adjustable awning which is easy to manufacture and maintain and which contains a minimum number of movable arms and parts. Such a device may be set up for use by any novice with little effort or instruction. It is both advantageous and desirable when used in connection with a fishing boat in that it protects the boat occupants from sun and rain and may be readily adjusted so as not to interfere with the fisherman's pole as he fishes. The device would also encourage women fishermen, since many of them refuse to sit in a summer's sun in spite of their great desire to fish.

Further objects and advantages of the invention will be found in the course of the following detailed description when viewed together with the accompanying drawing in which:

Fig. 5 is a broken isometric view showing the framework more in detail.

Fig. 6 is a broken view showing a typical end of the adjustable arms.

Fig. 7 is a broken view showing how the arms may be folded.

Fig. 8 is a broken sectional view showing the adjustable lock for securing the arms in an expanded, working position.

Fig. 9 is a broken view of the top end of the center standard.

Fig. 10 is a side view showing the device in a folded position.

Figure 4:
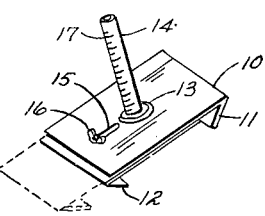
Fig. 4 is an isometric view of the base.

In the drawing numeral 10 designates the base of the device generally which consists, as seen in Fig. 4, of two metallic plates 11 and 12, the outer extremities of which are bent downwardly at an angle whereby the same may be clamped to a boat seat. One of these sheets 11 is provided with a flange 13 welded or otherwise affixed to the same in a manner to rigidly support the tubular upright 14. The plate 11 is also provided with a slot 15 through which is extended a bolt and nut arrangement 16, the bolt being rigidly attached to the face of the other plate 12. In this manner the distance between the lower projecting flanges formed on the outer ends of each plate may be widened or narrowed to be suitably clamped to various widths of boat seats. While this construction is shown as being adaptable for boat seats, it is to be understood that various changes could be made to adapt the same for mounting on a tractor or other item for supporting the upper framework subsequently described. In the base shown, the tubular upright 14 has horizontal divisions 17 scribed along the vertical length of the same in order that a fisherman might measure the length of the fish caught to see if the same is within the minimum length permitted by the State fish and game laws.

The tubular upright 14 is adapted for slidably receiving the lower end of a center standard designated generally by the numeral 18. The lower end of the standard 18 is circular in cross section and adapted to be slidably inserted into the tubular upright 14 whereby the same may be turned and set in any desired radial position by means of the set screw and knob 20. The upper end of the lower, circular member 19 of the center standard 18 is forced into a sleeve 21 which also carries one end of the upper part 22 of the standard 18. This upper part 22 is made square in cross section and terminates in a yoke 23 at its upper end which is more clearly illustrated in Fig. 9 of the drawing.

In Fig. 5, two main arms 24 and 25 are pivotally attached to the yoke 23 by a rivet or pin 26, the inner ends of the arms being flattened or constructed in a manner illustrated in Fig. 6 wherein a flat hinge member is forced into the end of the tubular arm 25 and spot welded or otherwise affixed to the same.

Each main arm is provided with stay rods 28 and 29 pivotally mounted to the same and to a common latch 30 which slidably encircles the square portion 22 of the standard 18. The latch 30 is provided with a spring mounted catch 31 which falls into a notch or hole 32 when the main arms 24 and 25 have been raised to right angles with the standard 18. To release the latch and lower the arms, pressure is applied to the lower end of the latch 31 to release it from its locking position in the hole 32 and the arms are lowered by pushing downwardly on either the latch or the arms. Hooked into the outer ends of the main arms 24 and 25 is a stabilizing wire 33 carrying rollers 34 and 35 and joined together at the center by a tension spring 36. The rollers are thus held tightly against the arms and press against the cloth 53 to keep the same from being blown about by the wind.

Figure 1:
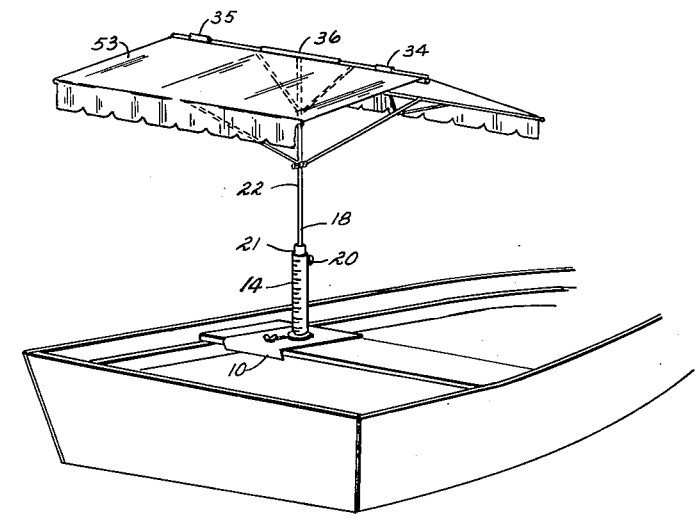
Fig. 1 is an isometric view showing an embodiment of my invention in an adjustable awning as mounted to the seat of a fishing boat.
Figure 3:
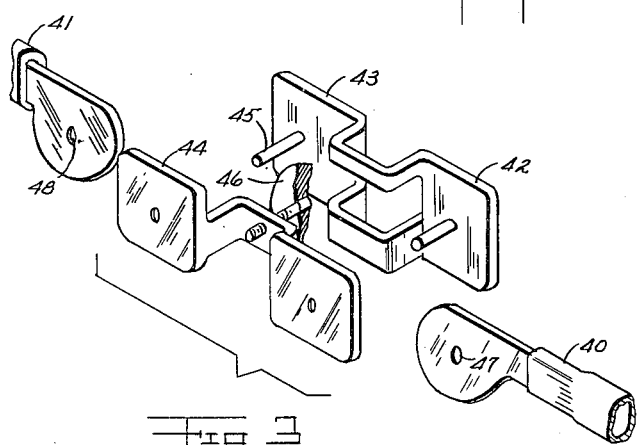
Fig. 3 is an exploded, isometric view of the adjustable handle member carrying a set of side arms.

The framework is further provided with two pairs of foldable side arms 38 and 39, each having stay rods 40 and 41 extended toward the central standard 18 where they are pivotally mounted to a common locking member 42, more clearly illustrated in Fig. 3 of the drawing. The locking member 42 consists in two halves 43 and 44, each having a yoke formed in the same; and when placed together, is adapted to embrace the square portion 22 of the standard 18. The two halves 43 and 44 are brought together over guide pins 45 and the same are held at various adjusted positions along the standard 18 by means of a set screw 46. The inner ends of the stay rods 40 and 41 are provided with holes 47 and 48 which are adapted to be positioned over the guide pins 45 and between the faces of each of the two halves 43 and 44. The spacing of the two halves is made to such a degree that when the set screw 46 is tightened against the standard, the two halves 43 and 44 will also be pressed against the ends of the stay rods to secure them against any movement. Roughing or knurling the abutting faces of the two halves and the sides of each stay rod end assures a positive hold against any movement.

Each of the side arms 38 and 39 is provided with braces and a latch member designated generally and respectively by numerals 49 and 50. These braces and latches are similar in construction with the braces and latches described as mounted on the upper end of the center standard 18 and permit a folding of the arms in a manner illustrated in Fig. 7 of the drawing. It will be noted that the upper end of the center standard 18 is provided with a notch or cradle 51 made by riveting two plates 52 to the standard 18. When folding the device the above described spring 36 is prevented from coming loose from its position, yet is ready for use when the device is again unfolded.

Figure 2:
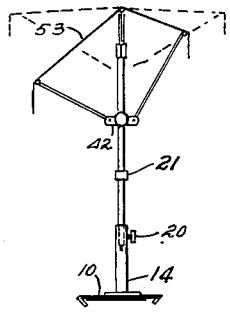
Fig. 2 is a smaller, side view of the invention showing a few of the adjustments of the framework.

The cloth covering 53 for the above described framework is provided with a seam 54 along its side edges and terminating slightly short of the center to permit the side arms to be inserted from the center of the cloth outwardly toward each end. The cloth covering 53 is not tied to the main arms in any manner but may be pulled across the top of the same to various adjusted positions as illustrated in Fig. 2.

When not in use, the device may be folded in the manner illustrated in Fig. 10 with the main arms 24 and 25 and the side arms brought against the center standard 18. In the illustration the cloth covering has been removed to more clearly show how the arms fold, but in actuality the cloth 53 is left on the framework. The device as shown here may be tied with a string or may be inserted into a specially prepared bag or box.

The cloth covering 53 may be woven, painted or printed with colors or designs including the advertising of various products. In the embodiment illustrated, the design would bear out some artistic nautical effect and made to advertise some boat landing handling the device whether for rent or for sale. As mentioned at the beginning of the specification, the cloth cover might be made to advertise brands of soft drinks or ice cream where the awning is used on a vendor's push cart.

The device, constructed as illustrated, is very rigid and is not affected even in considerable wind. It can be rotated, raised and lowered, one or both sides at a time by means of the side arms, or may be set at complete right angles to the standard 18. It is light in weight and may be folded into a compact bundle for easy carrying or shipping. As aforementioned, the base 10 may be altered by any skilled mechanic to permit bolting or otherwise attaching the device to a tractor, garden plow, lawn furnniture or other item where it is desired for use. The embodiment, as described, is to be considered as an example only and it is to be understood that other changes might be made without departing from the spirit and scope of the invention as defined by the following claims.

I claim:

1. A boat canopy comprising a base member adapted for attachment to said boat, a tubular upright attached to said base member, a standard slidably inserted into said tubular upright, a pair of main arms pivotally joined to each other and to the upper end of said standard, means for raising said main arms from a position substantially parallel to said standard to an open position at right angles thereto, means for locking said arms in such position, a pair of foldable side arms, one on each side of said standard and operatively connected thereto in a manner permitting the same to be spaced outwardly from said standard parallel to said main arms, a cloth cover loosely laid over said main arms and connected at two of its marginal edges to said side arms, means permitting vertical adjustment of said side arms and an individual, arcuate adjustment thereof with respect to said standard, and means for simultaneously locking said arms against both vertical and arcuate movement.

2. A boat conopy adapted to be mounted on a vehicle or the like comprising a base member, means on said base member for clamping the same to said vehicle, a tubular upright attached to said base, a standard having its lower end inserted into said tubular upright in a manner permitting radial rotation thereof, a pair of main arms having inner ends pivotally mounted to the upper end of said standard, whereby the same may be moved from a folded position lying substantially parallel to said standard to a position at right angles thereto, and means for locking said arms in such right angular position, two pairs of side arms, a pair of said side arms being oppositely disposed on each side of said standard, a movable locking member slidably mounted on said standard, a stay rod pivotally mounted on each side of said locking member and extended outwardly in a plane at right angles to the operating plane of said main arms, the inner ends of each pair of said side arms being pivotally joined to the outer ends of said stay rods, and adapted for being folded alongside of the same, means for locking each pair of side arms in an open position at right angles to its supporting stay rod in a plane parallel to said main arms, a cloth cover having its side edges affixed to each pair of side arms and positioned over said centrally disposed main arms, said locking member serving as a point of pivotation for separately positioning each of said stay rods to arcuately raise and lower the same whereby said cloth cover may be made to assume various positions as a sun shield.

3. A boat canopy comprising a base member adapted for attachment to the boat, a tubular upright attached to said base member, a standard slidably mounted in said upright, a pair of main arms pivotally mounted at the upper end of said standard, means for raising said main arms from a folded position substantially parallel to said standard to a position at right angles thereto and means for locking said arms in such right angular position, a locking member slidably embracing said standard, a pair of opposed stay rods having their inner ends pivotally supported by said locking member, each stay rod provided with equal length side arms at their outer ends foldable from a position parallel to the axis of their own stay rod to a position at right angles thereto, means for locking said side arms at right angles to its respective stay rod, a cloth cover mounted at one of its marginal edges to one pair of side arms, disposed loosely over said main arms and attached at another of its marginal edges to the other pair of side arms, means for securing said cloth cover from undue movement along said main arms, means for simultaneously locking said locking member to said standard and the inner ends of said stay rods to said locking member and means for locking said standard in said upright at selected vertical and radial settings.

4. A boat canopy comprising a base member adapted for attachment to the boat, a tubular upright attached to said base member, a standard slidably mounted in said tubular upright, means for locking said standard in said upright at various vertical and radial settings, a pair of main arms having ends pivotally attached to the upper end of said standard, said arms being movable from a folded position substantially parallel to the longitudinal axis of said standard to a position at right angles thereto, means for securing said main arms in such right angular position, a pair of opposed stay rods, each stay rod having a pair of side arms pivotally joined at the outer end thereof and foldable from a position substantially parallel to the longitudinal axis of its own stay rod to an open position at right angles thereto, means for securing said side arms in such right angular position, a locking member slidably embracing said standard and adapted for pivotally supporting the other ends of said stay rods, means for simultaneously locking said locking member to said standard and the ends of said stay rods to said locking member, a cloth cover secured to each pair of side arms and lain across the top of said main arms and means for increasing and decreasing the area covered by said cloth by vertical adjustments to said locking member, said locking means on said locking member permitting the setting of each stay rod separately at selected angles with respect to said standard.

5. A canopy comprising a base member, a tubular upright affixed to said base member, a standard slidably positioned in said upright in a manner whereby the standard may be adjusted to various vertical and radial settings, means for locking said standard from movement within said upright, a pair of foldable main arms pivotally joined to each other and to the topmost end of said standard, means for locking said main arms at a right angular position to the longitudinal axis of said standard, a locking member slidably embracing said standard, a pair of opposed stay rods pivotally joined to said locking member and adapted for movement therewith, a pair of foldable side arms for each stay rod, each pair of side arms having ends joined to each other and to the outer end of a stay rod, means for locking each pair of side arms at an unfolded, right angular position with respect to its own stay rod, said locking member embracing said standard and adapted for pivotally supporting the other ends of said stay rods, and being movable along said standard to permit increasing and decreasing the distance of said side arms away from said standard, a cover cloth attached at two of its marginal edges to said opposing side arms and lain across the top of said main arms, said locking member serving as a pivot point about which said stay rods may be moved to give adjustment to said cover cloth, and means for simultaneously locking said locking member to said standard and said stay rods to said locking member.

6. A foldable canopy for a boat or the like comprising a base member, a tubular upright affixed to said base member, a standard mounted for rotative and vertical movement in said upright, means for locking said standard to said upright, a pair of foldable main arms pivotally joined to each other and to the uppermost end of said standard, said main arms adapted for movement from a folded position substantially parallel to the longitudinal axis of said standard to an unfolded position at right angles thereto, means for locking said arms in such unfolded, right angular position, a locking member embracing said standard intermediate of said base member and said main arms, a pair of stay rods having one of their ends pivotally supported by said locking member in opposed positions on each side thereof, each of said stay rods being of equal length and provided with a pair of side arms, each pair of side arms being pivotally joined to its respective stay rod and arranged for opening from a folded, closed position, to a position at right angles thereto, means for locking each pair of side arms in an open position, a cloth cover affixed to each pair of side arms and locking means for said locking member for simultaneously securing said locking member to said standard and each of said stay rods to said locking member whereby either of said stay rods may be pivotally turned about said locking member to effect various adjustment of said cover cloth and secured in such adjusted position.

JAMES L. DUKE.

References Cited in the file of this patent

UNITED STATES PATENTS

| Number | Name | Date |
| --- | --- | --- |
| 192,489 | Descomtes | June 26, 1877 |
| 1,245,944 | Morgan | Nov. 6, 1917 |
| 1,932,958 | Denman | Oct. 31, 1933 |
| 2,289,806 | Rogers | July 14, 1942 |